United States Patent
Chevrier

(10) Patent No.: US 9,695,492 B2
(45) Date of Patent: Jul. 4, 2017

(54) METHODS AND SYSTEMS FOR PRODUCING FERRO-CHROME IN A DUPLEX FURNACE

(71) Applicant: Vincent Chevrier, Charlotte, NC (US)

(72) Inventor: Vincent Chevrier, Charlotte, NC (US)

(73) Assignee: Midrex Technologies, Inc., Charlotte, NC (US)

(*) Notice: Subject to any disclaimer, the term of this patent is extended or adjusted under 35 U.S.C. 154(b) by 244 days.

(21) Appl. No.: 14/291,701

(22) Filed: May 30, 2014

(65) Prior Publication Data

US 2014/0352494 A1 Dec. 4, 2014

Related U.S. Application Data

(60) Provisional application No. 61/830,189, filed on Jun. 3, 2013.

(51) Int. Cl.
*C21C 5/52* (2006.01)
*C21C 7/064* (2006.01)
(Continued)

(52) U.S. Cl.
CPC ............ *C22C 27/06* (2013.01); *C21C 5/5229* (2013.01); *C21C 5/5264* (2013.01); *C21C 7/064* (2013.01);
(Continued)

(58) Field of Classification Search
CPC ...... C21C 5/5264; C21C 5/5229; C21C 7/064
See application file for complete search history.

(56) References Cited

U.S. PATENT DOCUMENTS 4,235,623 A 11/1980 Rath
4,971,622 A * 11/1990 Slatter ...................... C22B 5/10
75/10.58

(Continued)

FOREIGN PATENT DOCUMENTS

JP 2001213232 A * 4/2004
WO WO 2004/036131 A1 * 4/2004 ........... C21C 5/5294

OTHER PUBLICATIONS

Kawaguchi et al. Machine translation of JP 2001-214232 A published Aug. 2001.*

(Continued)

*Primary Examiner* — George Wyszomierski
*Assistant Examiner* — Tima M McGuthry Banks
(74) *Attorney, Agent, or Firm* — Clements Bernard Walker PLLC; Christopher L. Bernard; Lawrence A. Baratta, Jr.

(57) ABSTRACT

A method for producing a high purity high carbon molten chrome product from chrome and carbon bearing material, said method comprising the steps of: (a) continuously introducing chrome compacts directly into an electric melter; (b) heating and melting the chrome compacts in the electric melter at a temperature of between about 1300° C. to about 1700° C. to form high carbon molten chrome; (c) preventing oxidation of the high carbon molten chrome via minimization of the ingress of oxygen containing gas in said heating step; (d) carburizing the high carbon molten chrome to form high carbon molten metallized chrome; (e) purifying the high carbon molten metallized chrome by reducing silicon oxides to silicon and desulfurizing the high carbon molten metallized chrome to produce the high purity high carbon molten chrome product; and (f) discharging the high purity high carbon molten chrome product from the electric melter.

22 Claims, 2 Drawing Sheets

(51) Int. Cl.
    C22C 1/06    (2006.01)
    C22C 1/02    (2006.01)
    C22C 27/06   (2006.01)
    C22B 34/32   (2006.01)
    C21B 13/00   (2006.01)
    C21B 13/10   (2006.01)
    C21B 13/14   (2006.01)

(52) U.S. Cl.
    CPC ............... *C22B 34/32* (2013.01); *C22C 1/02* (2013.01); *C22C 1/06* (2013.01); *C21B 13/006* (2013.01); *C21B 13/105* (2013.01); *C21B 13/143* (2013.01); *C21B 2200/00* (2013.01); *Y02P 10/212* (2015.11)

(56) References Cited

U.S. PATENT DOCUMENTS

| | | | | |
|---|---|---|---|---|
| 6,015,527 | A * | 1/2000 | Kamei | C21B 13/0046 266/145 |
| 6,251,156 | B1 | 6/2001 | Hoffman et al. | |
| 6,582,491 | B2 * | 6/2003 | Hoffman | C21B 13/10 75/10.63 |
| 8,262,766 | B2 * | 9/2012 | Sugitatsu | C21B 13/10 75/484 |
| 2003/0150295 | A1 * | 8/2003 | Demir | C21C 5/5264 75/503 |
| 2006/0096420 | A1 * | 5/2006 | Sugitatsu | C21B 13/10 75/504 |

OTHER PUBLICATIONS

Oct. 21, 2014 International Search Report Issued in International Patent Application No. PCT/US2014/040246.

* cited by examiner

METHODS AND SYSTEMS FOR PRODUCING FERRO-CHROME IN A DUPLEX FURNACE

CROSS-REFERENCE TO RELATED APPLICATION

The present patent application/patent claims the benefit of priority of U.S. Provisional Patent Application No. 61/830,189, filed on Jun. 3, 2013, and entitled "METHODS AND SYSTEMS FOR PRODUCING FERRO-CHROME IN A DUPLEX FURNACE," the contents of which are incorporated in full by reference herein.

FIELD OF THE INVENTION

The present invention relates generally to improved systems and methods for the production of molten ferro-chrome in a continuous duplex furnace operation. More particularly, the present invention relates to methods and systems for continuously processing ferro-chrome in an electric melting furnace.

BACKGROUND OF THE INVENTION

The present patent application/patent is related to U.S. Pat. Nos. 6,251,156 and 6,582,491, both of which relate to the production of iron in a duplex furnace, as well as U.S. Pat. No. 8,262,766, which relates to the production of ferro-chrome.

U.S. Pat. No. 6,251,156, in general, provides a method for the operation of a rotary hearth furnace in conjunction with an electric melter for the production of high purity iron product having a range of silicon and manganese, with low sulfur and phosphorus content. The method includes producing a high purity iron product and a range of carbon content product from iron oxide and carbon bearing compacts, including the steps of providing a furnace for the direct reduction of iron oxide and carbon bearing compacts, pre-reducing iron and carbon bearing compacts in a furnace having a rotary hearth surface, and producing intermediate carbon containing metallized iron. An electric melter furnace is utilized for receiving intermediate carbon containing metallized iron from the pre-reducing step, which is fed directly and continuously into a central interior area of the electric melter, with heating of the carbon containing metallized iron in the electric melter under elevated temperatures of about 1300° C. to about 1700° C., minimizing the ingress of air or other undesirable gases, such as oxygen, in the melting step while maintaining elevated temperatures, and removing high purity liquid iron product from the electric melter. The method provides a high iron content product having a specified range of carbon, silicon, and manganese percentages, with low sulfur and phosphorus content. There is significant reduction of silicon oxides, and reduction of manganese oxides in the product. An extremely desirable high iron content product is thereby produced for use by the steelmaking industry.

U.S. Pat. No. 6,582,491, in general, provides a method for the operation of a moving hearth furnace in conjunction with an electric melter for the production of high purity iron product having a range of silicon and manganese, with low sulfur and phosphorus content. The method includes producing high purity iron product and a range of carbon content product from iron oxide and carbon bearing agglomerates, including the steps of providing a furnace for the direct reduction of iron oxide and carbon bearing agglomerates, pre-reducing the iron and carbon bearing agglomerates in a furnace having a moving hearth surface, and producing intermediate carbon containing metallized iron. An electric melter furnace is utilized for receiving the intermediate carbon containing metallized iron from the pre-reducing step, which is fed directly and continuously into a central interior area of the electric melter, with heating of the carbon containing metallized iron in the electric melter under elevated temperatures of about 1300° C. to about 1700° C., minimizing the ingress of air or other undesirable gases, such as oxygen, in the melting step while maintaining elevated temperatures, and removing high purity liquid iron product from the electric melter. The method provides a high iron content product having a specified range of carbon, silicon, and manganese percentages, with low sulfur and phosphorus content. There is significant reduction of silicon oxides, and reduction of manganese oxides in the product. Again, an extremely desirable high iron content product is thereby produced for use by the steelmaking industry.

U.S. Pat. No. 8,262,766, in general, provides a method for reducing a chromium containing material at a high chromium reduction degree. In the method, a mixture of a feedstock containing chromium oxide and a carbonaceous reductant is heated and reduced by radiation heating in a moving hearth furnace. The average rate of raising the temperature of the mixture in the reduction is preferably about 13.96° C./s or higher in the period from the initiation of the radiation heating of the mixture until the mixture reaches about 1,114° C.

What are still needed in the art, however, are methods and systems for the operation of a rotary hearth furnace in conjunction with an electric melter for the production of a high purity ferro-chrome product having a range of silicon content, with low sulfur and phosphorus content.

BRIEF SUMMARY OF THE INVENTION

In various exemplary embodiments, the present invention provides methods and systems for the operation of a rotary hearth furnace in conjunction with an electric melter for the production of a high purity ferro-chrome product having a range of silicon content, with low sulfur and phosphorus content. The methods include producing a high purity ferro-chrome product and a range of carbon content products from chromite ore and carbon bearing compacts, including the steps of providing a furnace for the direct reduction of chrome oxide and carbon bearing compacts, pre-reducing chrome and carbon bearing compacts in a furnace having a rotary hearth surface, and producing intermediate carbon containing metallized chrome. An electric inciter furnace is utilized for receiving the intermediate carbon containing metallized chrome from the pre-reducing step, which is fed directly and continuously into a central interior area of the electric melter, with heating of the carbon containing metallized chrome in the electric melter under elevated temperatures of about 1600° C., minimizing the ingress of air or other undesirable gases, such as oxygen, in the melting step while maintaining elevated temperatures, and removing high purity liquid ferro-chrome product from the electric melter. The methods provide a high chrome content product having a specified range of carbon and silicon percentages, with low sulfur and phosphorus content. There is significant reduction of silicon oxides in the product. An extremely desirable high chrome content product is thereby produced for use by the stainless steelmaking industry. Silicon is controlled in the metal by reverting $SiO_2$ from a silica source (e.g., sand or bentonite) using carbon. A high chrome yield is achieved due to low $Cr_2O_3$ in the slag. Ferro-chromite ore, magnesiochromite ore and\or other waste chrome bearing materials may be used such as slag to the rotary hearth furnace. Operation in a partly submerged mode is possible. Further, the process may be implemented with or without the rotary hearth furnace.

In various exemplary embodiments, the present invention continuously feeds material containing chrome oxide and carbon compounds into a sequence of hot process steps. The first hot process step employs a rotary hearth furnace, operating below the melting point of the material, which effects pre-reduction of the material. The exit material from the rotary hearth furnace is continuously and preferably hermetically introduced into an electric melter wherein the material is further reduced at temperatures above the melting point of the material. The material exiting the pre-reduction rotary hearth furnace is never exposed to air or cooled between the exit port of the pre-reduction furnace and entry into the electric inciter. The invented methods and systems produce a high purity chrome melt containing a specified percentage of carbon. Starting materials are introduced into the rotary hearth pre-reduction process in layers in the form of compacts (e.g. compressed material). Pre-reduced material from the rotary hearth step is fed continuously and directly into the central interior area of the electric melter. The electric melter is maintained at a temperature exceeding the melting point of the material and the ingress of oxygen is minimized to guarantee efficient reduction. High purity ferro-chrome product is periodically removed from the electric inciter.

Utilizing a pre-reduction step of heating chrome-bearing compacts in a rotary hearth furnace, then directly and continuously feeding the carbon containing metallized chrome into an electric melter effectuates a very high chrome content product having high percentages of carbon. Moreover, melting process conditions are such that the sulfur content is minimized and some $SiO_2$ is reduced to silicon in the final product. Therefore, an extremely desirable high chrome content product is provided for use by the stainless steelmaking industry.

The objects of the invention are met by the method and system for producing the highly purified chrome and the high percentage carbon product from chrome oxide bearing materials, comprising the steps of providing a furnace for direct reduction of chrome oxide bearing materials containing carbon in the form of compacts, layering the the chrome oxide and the carbon bearing compacts in the furnace, pre-reducing the chrome oxide and the carbon compacts, accomplishing the pre-reducing step in a furnace having a rotary hearth surface, the pre-reducing step producing hot carbon containing metallized chrome, then using an electric melter furnace for receiving hot carbon containing metallized chrome from the pre-reducing step, the second hot process step including placing said electric melter furnace in close proximity to the rotary hearth furnace. After the rotary hearth furnace step, the hot, solid carbon containing metallized chrome material is used to directly and continuously charge an electric inciter. The charge is inserted into the central interior area of the electric melter nearest the molten chrome bath/electrode interface, or in other electric melters, inserted into the region of minimum slag, effecting rapid heating of the carbon containing metallized chrome to liquefying temperatures while minimizing the ingress of oxygen to assure optimum reduction conditions. Lastly, high purity chrome product from the electric melter is periodically withdrawn without interrupting the continuous operation of the furnaces. The method of utilizing a pre-reduction step of heating carbon-containing chrome oxide compacts in a rotary hearth furnace, and directly, continuously and hermetically feeding the hot, solid carbon containing metallized chrome from this furnace into an electric melter provides a high chrome content product having high percentages of carbon, with significant desulfurization of the product and significant reduction of silicon oxides to silicon.

In one exemplary embodiment, the present invention provides a method for producing a high purity high carbon molten chrome product from chrome and carbon bearing material, said method comprising the steps of: (a) continuously introducing chrome compacts directly into an electric melter; (b) heating and melting the chrome compacts in the electric melter at a temperature of between about 1300° C. to about 1700° C. to form high carbon molten chrome; (c) preventing oxidation of the high carbon molten chrome via minimization of the ingress of oxygen containing gas in said heating step; (d) carburizing the high carbon molten chrome to form high carbon molten metallized chrome; (e) purifying the high carbon molten metallized chrome by reducing silicon oxides to silicon and desulfurizing the high carbon molten metallized chrome to produce the high purity high carbon molten chrome product; (f) discharging the high purity high carbon molten chrome product from the electric melter; and (g) maintaining a minimum high purity high carbon liquid chrome heel of between about 1 to about 4 times the quantity of the intermittently tapped high purity high carbon molten chrome product. The heating and melting step is carried out with electrodes of pre-baked material, the pre-baked material selected from the group consisting of carbon and graphite. The method also includes maintaining a reducing environment within the electric melter. The method further includes establishing an inert gas purge within the electric melter. Optionally, the inert gas purge within the electric melter is nitrogen gas purge. Optionally, the method includes maintaining a temperature of between about 1600° C. to about 2000° C. within the electric melter. Optionally, the method includes maintaining a temperature of between about 1600° C. to about 2000° C. within the electric melter for optimal reduction of silicon oxide to silicon in the high carbon molten metallized chrome. Optionally, the method includes maintaining a temperature of between about 1800° C. to about 2000° C. within the electric melter to enhance slag fluidity. Optionally, the method includes maintaining a temperature within the electric melter to enhance sulfur removal from the high carbon molten metallized chrome. The chrome bearing materials and the carbon containing materials are formed from materials selected from the group consisting of chrome bearing waste material, steel mill sludge, mill scale, dust, chrome oxides, silicon oxide compounds, sand, taconite, manganese oxide compounds, aluminum oxide compounds, and a binder. The high purity high carbon molten ferro-chrome product contains at least about 50% reduced chrome. The continuously introducing step further comprises adding carbon containing compounds into the electric melter. The continuously introducing step further comprises adding slag conditioning materials into the electric melter. The discharging step further comprises adding carbon containing compounds into the high purity high carbon molten chrome product. The method still further includes maintaining a fluid of low density slag in the electric melter. The method still further includes controlling Si in the metal by reverting $SiO_2$. The method still further includes ensuring a high chrome yield by using low $Cr_2O_3$ slag in a reducing atmosphere, controlling slag chemistry, slag temperature, fluidity, and carbon content. The method still further includes using ferro-chromite ore, magnesio-chromite ore, and/or waste chrome bearing material, such as slag or dust. Optionally, the method includes operating the electric arc furnace in a partially submerged mode with a short arc to achieve high slag temperatures. Optionally, the feed comprises coke and chromite pellets.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Again, in various exemplary embodiments, the present invention provides methods and systems for the operation of a rotary hearth furnace in conjunction with an electric inciter for the production of a high purity ferro-chrome product having a range of silicon content, with low sulfur and phosphorus content. The methods include producing a high purity ferro-chrome product and a range of carbon content products from chromite ore and carbon bearing compacts, including the steps of providing a furnace for the direct reduction of chrome oxide and carbon bearing compacts, pre-reducing chrome and carbon bearing compacts in a furnace having a rotary hearth surface, and producing intermediate carbon containing metallized chrome. An electric inciter furnace is utilized for receiving the intermediate carbon containing metallized chrome from the pre-reducing step, which is fed directly and continuously into a central interior area of the electric inciter, with heating of the carbon containing metallized chrome in the electric inciter under elevated temperatures of about 1600° C., minimizing the ingress of air or other undesirable gases, such as oxygen, in the melting step while maintaining elevated temperatures, and removing high purity liquid ferro-chrome product from the electric melter. The methods provide a high chrome content product having a specified range of carbon and silicon percentages, with low sulfur and phosphorus content. There is significant reduction of silicon oxides in the product. An extremely desirable high chrome content product is thereby produced for use by the stainless steelmaking industry. Silicon is controlled in the metal by reverting $SiO_2$ from a silica source (e.g., sand or bentonite) using carbon. A high chrome yield is achieved due to low $Cr_2O_3$ in the slag. Ferro-chromite ore, magnesio-chromite ore and\or other waste chrome bearing materials may be used such as slag to the rotary hearth furnace. Operation in a partly submerged mode is possible. Further, the process may be implemented with or without the rotary hearth furnace.

Figure 1:
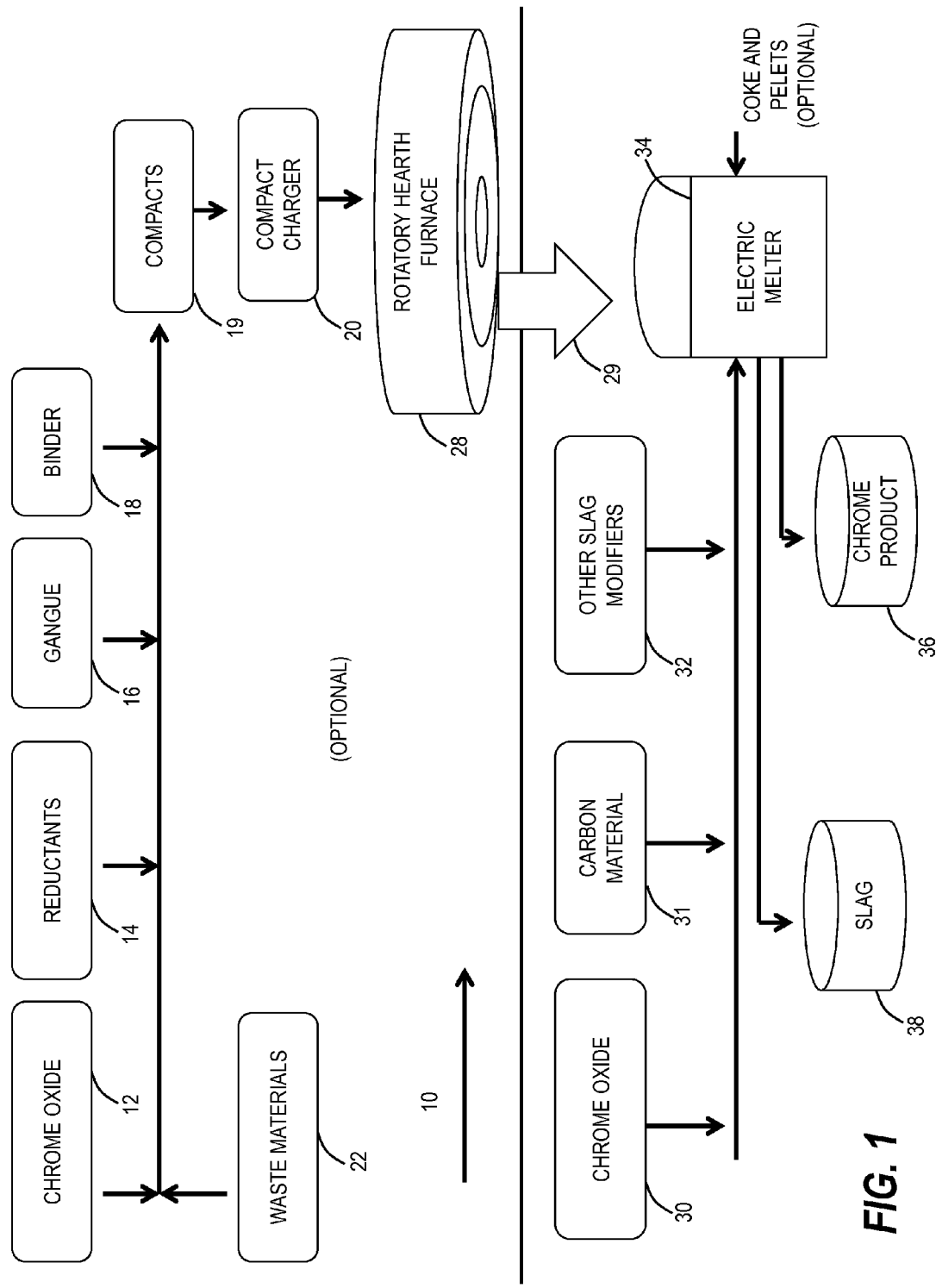
FIG. 1 is a flowchart of the method for producing high purity ferro-chrome in accordance with the present invention.

Referring now specifically to FIG. 1, the overall method 10 uses a first and a second hot process to produce the desired end product. The input materials consist of: chrome oxides 12 or chrome bearing waste materials 22, such as dust, sludge, mill scale, or a combination thereof; reductants 14, such as coal powder, coal fines, and other carbonaceous materials; slag formers 16, such as $SiO_2$, CaO, $Al_2O_3$, $CaF_2$ (fluorspar), and/or MgO; and a binder 18. These materials are formed into compacts 19, preferably in the form of uniformly-sized briquettes or pellets. The compacts fill hopper 20 from which they are continuously conveyed to an input port of a rotary hearth furnace 28. The chrome oxide bearing compacts are placed in a layer or layers over the hearth surface 42. The hearth rotates, progressing the material through two or more hot zones that effect a reduction of the oxides without the material becoming liquid. The exit material, pre-reduced chrome, DRC, of this first hot process is 70% to 95% metallized chrome at a temperature of approximately 700° C. to approximately 1100° C. The pre-reduced DRC material is conveyed directly, hermetically and continuously via feed leg 29 from the rotary hearth to charge an electric melter 34. The DRC is fed directly and continuously into the central portion of the melter where it is liquified very rapidly (within seconds). The melter further refines the liquid chrome material as well. The assay of the final chrome material can easily be modified by controlling conditions in the furnace. Slag modifiers 32 or carbon materials 31 may be used as necessary to control the final output material and/or the viscosity of the slag. The melter is periodically tapped to remove a portion of the slag 38 and, subsequently, the liquid chrome product 36. Carbon materials 31 may be added upon tapping. The steps of the method produce high purity molten chrome, with specified carbon and silicon and extremely low sulfur at an exit temperature of about 1300° C. to about 1700° C. The position within each range may be specified.

The foregoing is a brief overview of the method. The details will now be developed in a discussion of the apparatus used.

Figure 2:
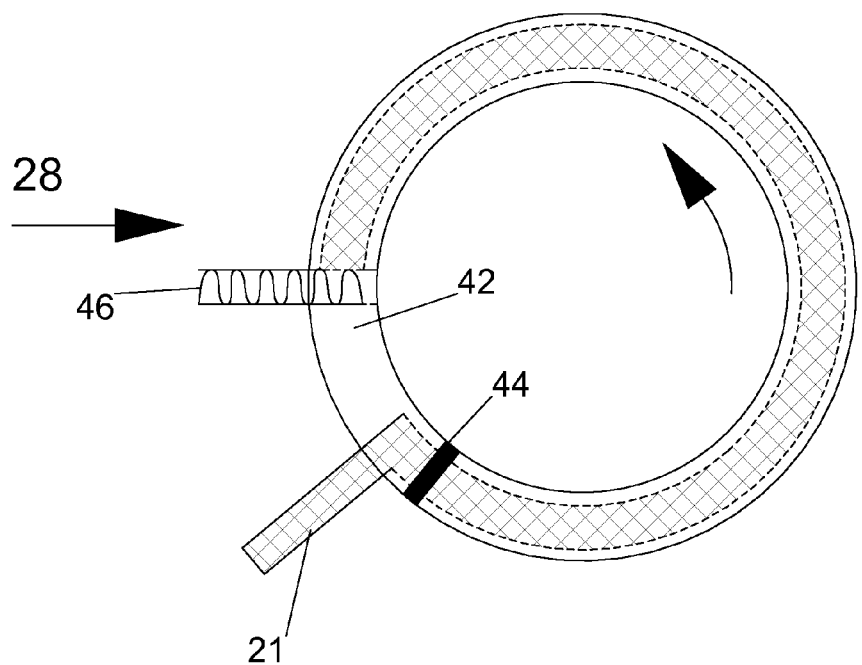
FIG. 2 is a schematic top view of the rotary hearth furnace utilized in accordance with the present invention.

Referring now specifically to FIG. 2 for the elements of the rotary hearth furnace 28. Heat processing may be accomplished by fixed gas burners, tilting gas burners, or other devices for heating a furnace. The input materials from hopper 20 are compacts 19 that consist of chrome oxides 12 and/or chrome bearing waste materials 22; reductants 14, such as coal powder, coal fines, and other carbonaceous materials; slag formers 16, such as $SiO_2$, CaO, $Al_2O_3$, $CaF_2$ (fluorspar), and/or MgO; and a binder 18. The conveyor 21 may be a vibratory feed conveyor or other standard continuous belt, pneumatic or spiral conveyor of pellet-sized materials. The compacts 19 contain slag formers feed material 16 with CaO and/or MgO additions so that the lime/silica, C/S ratio (% CaO/% $SiO_2$) and/or "V" ratio (% CaO+% MgO)/(% $SiO_2$+% $Al_2O_3$) can be tailored to a specific composition that then influences desulfurization of the bath by the slag generated in the melter.

The placement of the material within the rotary hearth furnace includes layering of the chrome oxide bearing material compacts 19 onto the hearth surface 42 in a single layer (e.g. 100% loading) or multiple layers (e.g. 200% loading). The loading is accomplished by the rate at which compacts are delivered to the furnace in combination with the height of a leveler 44 above the hearth surface. This procedure lends itself to uniform heating of the compacts and produces uniform chemistry of the DRC product.

The metallized chrome material discharged from the rotary hearth furnace 28 of the pre-reducing step includes sulfur, phosphorus, and metal oxide compounds from slag formers contained in the chrome bearing feed materials, reductant ash. The hot DRC product contains sufficient carbon to accommodate carburization of the hot metal in the electric melter 34 as well as reduction of residual CrO and partial reduction (about 1% to about 99%) of other oxide species, such as $SiO_2$, plus any excess carbon as required by the process. The temperature of the exit material from the rotary hearth furnace 28 should preferably be in the range of approximately 700° C. to approximately 1100° C. The carbon containing metallized chrome product from the rotary hearth furnace 28 is metallized to approximately 70% to 95% chrome content on the hearth surface. The material is conveyed directly, continuously, and hermetically to charge an electric melter by feed leg 29 which is a discharge conveyor.

Figure 3:
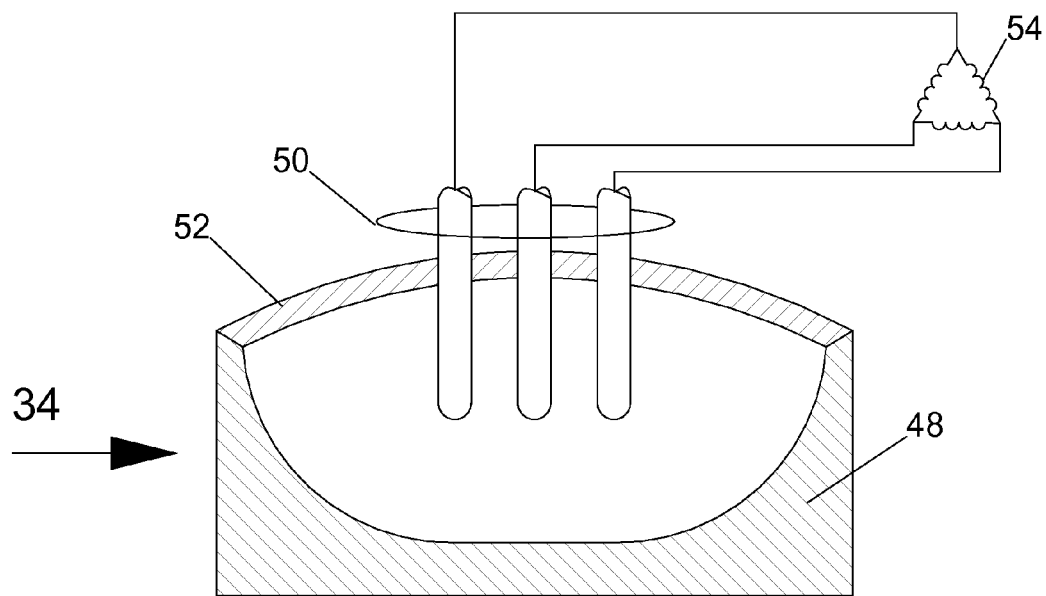
FIG. 3 is a schematic cross-sectional view of the electric inciter, e.g. a 3-phase electric arc furnace, used in accordance with the present invention.

Referring now specifically to FIG. 3, which is a diagrammatic cross-section of a typical electric melter 34, various types of electric melters can be adapted for this application. There are two basic types, arc types and induction types. Either type may be used. Electric arc types are preferred for use. There are a number of variations in arc furnace designs. The type illustrated here is an electric arc furnace 34 that employs a non-conducting hearth 48 and 3-phase alternating current (AC) power 54. The furnace is used both for melting and refining the charge. The preferred furnace has an insulating roof 52, penetrated by electrodes 50. The illustrated electrodes are powered by a 3-phase power source. Single phase AC and DC types may also be used. The secondary of the transformer that drives the electrodes 50 illustrates the fact that the power input, and therefore the temperature, is readily adjustable.

As part of the feeding step, hot DRC is directly charged to the electric arc melter 34, and directed preferably toward the center of the melter, near the region of arcing between the electrodes and molten chrome bath. Additional chrome oxide 30, carbon compounds 31, and slag modifiers 32, including lime, silicates, and fluxing agents may be added to the electric arc melter, as necessary, to augment the composition of the hot DRC discharged from the rotary hearth furnace 28. Melting of DRC compacts occurs in mere seconds after being charged into the electric arc melter 34.

For the electric melter heating step, use of pre-baked carbon or graphite electrodes is preferred to Soderburg (self-baking) type electrodes. This simplifies operation, reduces capital expense, and improves electrical efficiency. Maintaining atmospheric integrity includes eliminating or minimizing the ingress of air and other undesirable gases into the melter. Minimization of air ingress prevents reoxidation of reduced chrome, molten chrome and any other reduced species or alloyed species in the molten chrome. For the electric arc inciter, a special seal having purge gas capability may be utilized around the electrode delta or other electrode configuration where the electrodes 50 penetrate the melter through the roof 52.

Since an electric melter is not dependent on combustion of fuels with air or oxygen enriched air, or post combustion of evolved combustibles from the molten chrome bath with air, oxygen enriched air or oxygen, the reducing atmosphere is readily maintained. For example, some hybrid smelting reduction processes rely on the post-combustion of evolved CO and $H_2$ gases from a molten chrome bath gasifier for energy input to process preheated chrome ore and/or pre-reduced chrome oxide bearing materials. In fact, combustion-based melting or smelting processes may produce combustion products which are in equilibrium with the molten chrome, or favor reduction of chrome oxide bearing materials, but still be oxidizing to other reduced or alloyed species which are desirable components in the molten chrome, e.g., species such as Si. In the invented method of operation, the electric melter 34 has a distinct advantage over the combustion-based melters and/or smelters.

As part of the heating step within the electric melter, a low density slag condition is maintained within the electric melter as a key process consideration because the low density slag promotes easy penetration of hot DRC compacts into the electric melt zone. Furthermore, low density slag rapidly imparts a high heat transfer to the DRC, which improves the DRC melting rate within the electric melter.

As a benefit of the pre-reducing step, and the subsequent use of an electric melter furnace, the $SiO_2$ contained in the hot DRC compacts directly fed to the melter are subjected to a melting environment in the electric melter 34 that may be manipulated to be conducive to reduction of $SiO_2$ and/or SiO to [Si] (silicon contained in molten chrome), which becomes easily assimilated into the molten chrome. The degree of silicon oxide reduction is easily controlled by bath temperature. i.e. the higher the temperature, the higher the extent of silicon oxide, and the greater the rate of silicon pick-up in the liquid chrome bath. The electric melter bath temperatures can be controlled by varying the power input to the melter via the electrodes. Another alternative is the addition into the electric melter of chrome oxide 30, silicon oxides, aluminum oxides, and other slag conditioning materials 32. Key to the present invention is to control the silicon level in the bath by carbon addition to the melter, including to through hearth powder.

Optimal electric melter operation for desulfurization of the hot DRC compacts is accomplished by high temperatures and the basic components (CaO) contained in the DRC compacts. As the $SiO_2$ contained in the DRC compacts is reduced to Si, the effective lime to silica ($CaO/SiO_2$) ratio in the slag increases, which in turn increases the desulfurization potential of the slag.

The electric melter 34 should maintain a large molten chrome heel of about 1 to about 4 times the tapped metal quantity. The optimal temperature for normal operations of the electric melter for reducing silicon oxides is the temperature range of approximately 1000° C. to approximately 2000° C. at the tap. The furnace is tapped periodically for both hot metal and slag without interrupting the continuous charging and melting operations. The tapholes are then resealed using methods known in the art.

The optimum operation of the electric melter 34 requires minimizing the ingress of oxygen while maintaining the temperatures outlined above. The output 36 of the improved method 10 is high purity chrome having a desirably low, specified maximum sulphur content and silicon content, and a desirably high specified carbon content. Slag 38, having low concentrations of chrome, is separated within the electric melter 34 and removed separately from the high purity chrome product 36. Low sulphur content chrome having the above described characteristics including a high carbon content is extremely desirable to stainless steelmakers because normal desulfurization in the steelmaking vessel is either minimized or unnecessary. The above described method of operation leads to both increased productivity of higher purity chronic product and lower operating costs in the stainless steelmaking industry.

From the foregoing, it is readily apparent that the present invention provides a method that achieves efficient reduction of chrome oxide bearing materials at elevated temperatures in a series of furnaces, efficient continuous production of high purity liquid chrome having concentrations of carbon of about 4% to about 12%, silicon about 1% to about 10%, at elevated temperatures with separation of slag components from the purified liquid chrome-carbon end product, and desulfurizing high purity chrome and reducing contaminants in direct reduced chrome by continuously feeding an electric melter.

The following options should also be noted. First, the carbon source for the melter may be a carbonaceous substance such as hearth powder. Advantageously, hearth powder is cheaper than the coke traditionally used in smelters. The rotary hearth furnace devolatilizes the coal, similar to the coking process, which provides energy to the rotary hearth furnace and minimizes volatilization in the melter. The amount of carbon in the ferro-chrome is controlled by the amount of hearth coal going into the rotary hearth furnace (i.e. the process control point). Second, the off-gas from the melter (i.e. a reducing atmosphere) may be vented through the rotary hearth furnace, providing the rotary hearth furnace with extra heat and extra reducing gas.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for producing a high purity high carbon molten chrome product from chrome and carbon bearing material, said method comprising the steps of:
   (a) continuously introducing chrome compacts directly into an electric melter;
   (b) heating and melting the chrome compacts in the electric melter to form high carbon molten chrome;
   (c) preventing oxidation of the high carbon molten chrome via minimization of the ingress of oxygen containing gas in said heating step;
   (d) carburizing the high carbon molten chrome to form high carbon molten metallized chrome;
   (e) purifying the high carbon molten metallized chrome by reducing silicon oxides to silicon and desulfurizing the high carbon molten metallized chrome to produce the high purity high carbon molten chrome product;
   (f) controlling a silicon level in the electric melter by adding carbon to the electric melter, wherein some carbon is added to the electric melter with the chrome compacts via a pre-reduction furnace and additional carbon is added to the electric melter from a source separate from the chrome compacts and the pre-reduction furnace; and
   (g) discharging the high purity high carbon molten chrome product from the electric melter.

2. The method of claim 1, further comprising:
   (h) maintaining a minimum high purity high carbon liquid chrome heel of between about 1 to about 4 times the quantity of the intermittently tapped high purity high carbon molten chrome product.

3. The method of claim 1, wherein said heating and melting step is carried out with electrodes of pre-baked material, the pre-baked material selected from the group consisting of carbon and graphite.

4. The method of claim 1, further comprising maintaining a reducing environment within the electric melter.

5. The method of claim 4, further comprising establishing an inert gas purge within the electric melter.

6. The method of claim 5, wherein the inert gas purge within the electric melter is nitrogen gas purge.

7. The method of claim 1, further comprising maintaining a temperature of between about 1600° C. to about 2000° C. within the electric melter.

8. The method of claim 7, further comprising maintaining a temperature of between about 1600° C. to about 2000° C. within the electric melter for optimal reduction of silicon oxide to silicon in the high carbon molten metallized chrome.

9. The method of claim 7, further comprising maintaining a temperature of between about 1800° C. to about 2000° C. within the electric melter to enhance slag fluidity.

10. The method of claim 7, further comprising maintaining a temperature within the electric melter to enhance sulfur removal from the high carbon molten metallized chrome.

11. The method of claim 1, wherein the chrome bearing materials and the carbon containing materials are formed from materials selected from the group consisting of chrome bearing waste material, steel mill sludge, mill scale, dust, chrome oxides, silicon oxide compounds, sand, taconite, manganese oxide compounds, aluminum oxide compounds, and a binder.

12. The method of claim 1, wherein the high purity high carbon molten ferro-chrome product contains at least about 50% reduced chrome.

13. The method of claim 1, wherein said continuously introducing step further comprises adding carbon containing compounds into the electric melter.

14. The method of claim 1, wherein said continuously introducing step further comprises adding slag conditioning materials into the electric melter.

15. The method of claim 1, wherein said discharging step further comprises adding carbon containing compounds into the high purity high carbon molten chrome product.

16. The method of claim 1, further comprising maintaining a fluid of low density slag in the electric melter.

17. The method of claim 1, further comprising controlling Si in the metal by reverting $SiO_2$.

18. The method of claim 1, further comprising ensuring a high chrome yield by using low $Cr_2O_3$ slag in a reducing atmosphere, controlling slag chemistry, slag temperature, fluidity, and carbon content.

19. The method of claim 1, further comprising using ferro-chromite ore, magnesio-chromite ore, and/or waste chrome bearing material, such as slag or dust.

20. The method of claim 1, further comprising operating the electric arc furnace in a partially submerged mode with a short arc to achieve high slag temperatures.

21. The method of claim 1, wherein the feed comprises coke and chromite pellets.

22. The method of claim 1, wherein off-gas from the electric melter is vented through an associated rotary hearth furnace.

* * * * *